March 24, 1970   C. L. WATSON   3,502,275
SOIL CONDITIONER
Filed Sept. 20, 1968   3 Sheets-Sheet 1
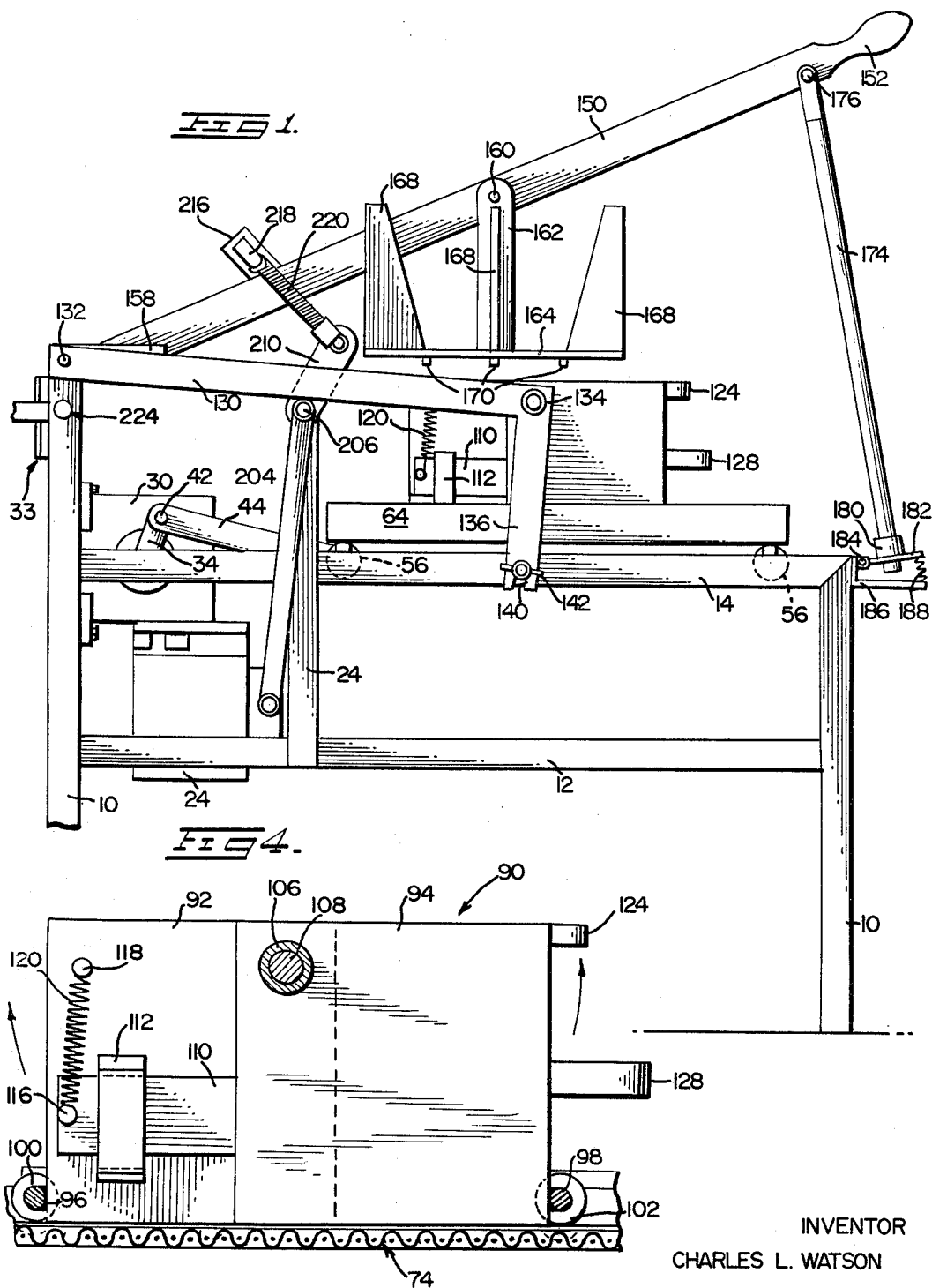
INVENTOR
CHARLES L. WATSON

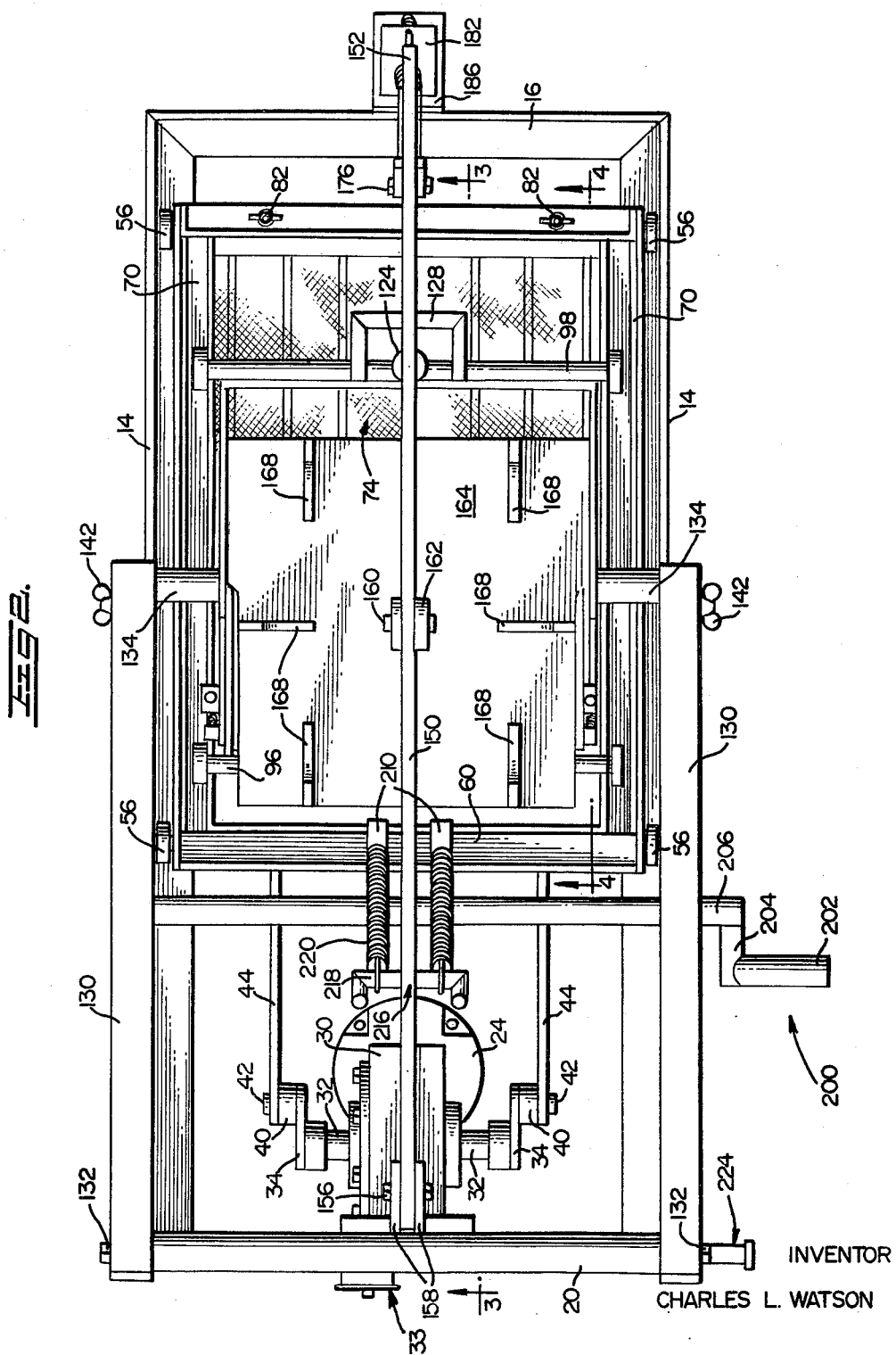

March 24, 1970
C. L. WATSON
3,502,275
SOIL CONDITIONER
Filed Sept. 20, 1968
3 Sheets-Sheet 3
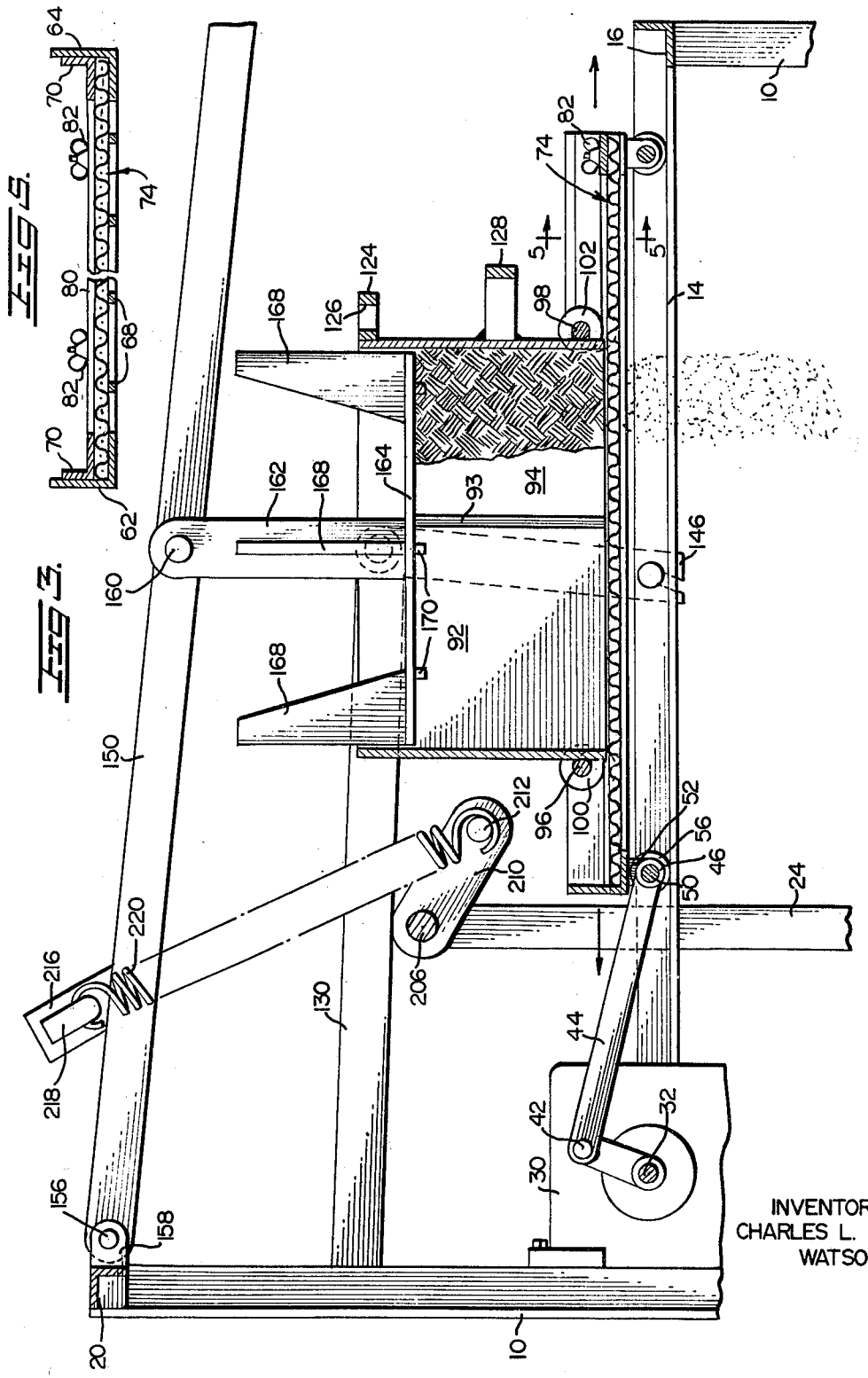
INVENTOR
CHARLES L.
WATSON United States Patent Office 3,502,275
Patented Mar. 24, 1970

1

3,502,275
SOIL CONDITIONER
Charles L. Watson, 410 N. Broadway,
Hugo, Okla. 74743
Filed Sept. 20, 1968, Ser. No. 761,266
Int. Cl. B02c 19/20
U.S. Cl. 241—84          17 Claims

ABSTRACT OF THE DISCLOSURE

A supporting framework supports a reciprocating screen rack thereon, this screen rack supporting a removable screen. A material receiving box is supported in overlying relationship to the screen, the material box being held in a fixed position. A pressure plate is received through the upper part of the material box for engaging material therewithin. The pressure plate is pivotally interconnected with an elongated operating member which is adapted to be resiliently pressed in a downward direction and held in a down position to apply pressure to the material in the material box.

BACKGROUND OF THE INVENTION

When constructing embankments, fills, foundations, dams, roads, levies, dykes and the like of soil, the soil must be conditioned or processed in the field for making standard and rapid method moisture density determinations required for construction control.

The soil may for example be processed through a number 4 sieve at field moisture. Soil which is properly conditioned will absorb moisture readily and it will dry rapidly when placed in an oven. It can also be hammered into mold without voids. It is desirable to condition the soil by producing thin flakes thereof regardless of moisture content and also to segregate any rock or gravel.

In the past, soil samples have been conditioned by hand. This is a very difficult and time-consuming process, and accordingly it is desirable to provide a mechanical means for carrying out this operation.

In a typical situation, approximately 20 pounds of soil must be rubbed through a number 4 screen sieve to process a soil sample. The more uniform the breakdown of material, the more accurate the results of tests therewith, and accordingly it is desirable to provide a mechanism which will result in maximum uniformity of breakdown of material.

SUMMARY OF THE INVENTION

The present invention provides mechanical aparatus for processing soil to produce thin flakes thereof, and wherein a maximum amount of soil can be processed with a minimum of time and effort to provide conditioned soil similar to that produced by the hand operated methods of the prior art.

In the present invention, a removable screen is provided so that the screen size can be changed as required to thereby control the size of the flakes of soil produced. The removable screen feature of the invention also enables the screen to be readily cleaned upon the removal from the apparatus. The desired thickness of the flakes may be controlled by the amount of pressure plate which fits within the material box. Resilient means is provided in the apparatus for applying resilient pressure to the pressure plate to thereby control the thickness of the soil flakes.

The material is received within a material box including two pivotally interconnected portions. The pivotal interconnection of these two portions of the material box prevents bridging of material therewithin.

The pressure plate includes guide means which prevents it from wedging in place within the associated material box, and the movable mounting of the pressure plate ensures that it will clean the sides of the box as it moves therethrough. Additionally, the pressure plate is provided with bars extending across the undersurface thereof to prevent rolling of material with respect thereto.

The operating means for the pressure plate includes holding means which ensures that the pressure plate will be held in its lowermost position at any point in the operation of the apparatus to prevent the pressure plate from moving upwardly while soil is being processed.

BRIEF DESCRIPTION OF THE DRAWINGS

FIGURE 1 is a side view of a soil conditioner according to the present invention;

FIGURE 2 is a top view of the apparatus illustrated in FIGURE 1;

FIGURE 3 is a sectional view taken substantially along line 3—3 of FIGURE 2 looking in the direction of the arrows;

FIGURE 4 is a sectional view on an enlarged scale taken substantially along line 4—4 of FIGURE 2 looking in the direction of the arrows; and FIGURE 5 is a sectional view take substantially along line 5—5 of FIGURE 3 looking in the direction of the arrows.

DESCRIPTION OF THE PREFERRED EMBODIMENT

Referring now to the drawings wherein like reference characters designate corresponding parts throughout the several views, a supporting framework is formed of angle iron members suitably rigidly interconnected as by welding or the like and including four spaced vertically extending legs 10. A pan rack 12 is supported at an intermediate point along said legs and is adapted to support a pan thereon for receiving soil from the screen disposed thereabove as hereinafter described. A pair of angle members 14 provide track members for the screen rack hereinafter described, opposite ends of angle members 14 being connected by angle member 16 one of which is visible in FIG. 2. Angle members 14 and 16 are connected to legs 10. The upper ends of the left-hand legs 10 as seen in the drawing are interconnected by an angle member 20 extending therebetween.

The drive means includes an electric motor 24 which in a typical example may be a one-half horsepower motor, this motor being drivingly connected with a gear box 30 which may have a 40:1 ratio adapted to rotate an output drive shaft 32 at approximately 35 r.p.m. The electric motor and gear box is suitably supported by the supporting framework, and a manually operated control switch 33 is provided for controlling the operation of the electric motor.

As seen most clearly in FIG. 2, the drive shaft 32 extends from opposite sides of the gear box 30 and each end of the drive shaft is connected with a crank throw 34. Each of the crank throws is connected with a bushing 40 which receives a crank pin 42 connected with one end of an associated connecting rod 44. The opposite ends of these connecting rods are operatively connected with bushings 46 mounted upon a roller shaft 50 as seen in FIG. 3. Spaced portions of this roller shaft are journaled within bushings 52 secured to the undersurface of the screen rack hereinafter described, and rollers 56 are secured to opposite ends of the roller shaft 50 for supporting the screen rack for reciprocating motion along the members 14 previously described.

The screen rack includes an end angle member 60 and a pair of side angle members 62 and 64 extending from opposite ends of the end member 60. The opposite ends of side angle members 62 and 64 are interconnected by a cross member 66 to provide a rigid rack. A plurality of spaced elongated members 68 extend longitudinally within the central portion of the rack so as to support a screen on the rack and yet to provide substantial open spaces through which soil may drop through the rack. A pair of angle members 70 are secured to the inwardly facing surfaces of the side angle members 62 and 64 with the bottom legs of the angle members 70 being spaced from the bottom legs of the angle members 62 and 64 to provide a space therebetween for receiving a screen means indicated generally by reference numeral 74. The screen means may be slid into place through the open end of the rack adjacent the cross member 66, and the screen means is then clamped in position by a flat clamping plate 80 which is secured in place by wing nuts 82. The screen may be of any shape of size mesh and cleaned without removal from the apparatus if desired by raising and blocking up the material box hereinafter described.

The material box which receives the soil to be conditioned is indicated generally by reference numeral 90 and includes two movably interconnected portions 92 and 94, each of these portions being of generally U-shaped cross-section as seen from above, the portion 92 fitting within the portion 94. As seen most clearly in FIG. 3, opposite end edges of the portion 92 are beveled as indicated by reference numeral 93 to eliminate square edges.

As seen most clearly in FIG. 4, shafts 96 and 98 are rigidly secured to the outer lower portions of member 92 and 94, and rollers 100 and 102 are rotatably supported at the opposite ends of these shafts, these rollers riding on the bottom legs of the angle members 70 of the screen rack previously described whereby the material box is adapted to be supported on the screen rack, while the screen rack reciprocates with respect to the material box which is held in position during operation of the apparatus.

The two portions 92 and 94 of the material box are pivotally interconnected with one another by providing a pair of tubular members 106 extending from opposite side walls of member 94 and being aligned with holes formed in the side walls, the holes and the tubular members receiving shafts 108 secured to opposite sides of the inner member 92, these shafts extending through members 106 and beyond the ends thereof for a purpose hereinafter described. Shafts 108 are rotatable with respect to tubular members 106 whereby members 92 and 94 are pivotally interconnected with one another about the axes of shafts 108.

Tongues 110 are secured to the opposite side walls of member 94 and extend longitudinally therefrom, these tongues being received within U-shaped straps 112 fixed to opposite side walls of portion 92 of the material box. As seen most clearly in FIG. 4, the vertical dimension of the space defined within straps 112 is greater than the vertical dimension of the tongues 110 to thereby permit limited pivotal movement of portion 94 of the material box with respect to portion 92 thereof.

Pins 116 extend laterally outwardly from the tongues 110, and pins 118 extends from opposite side walls of the portion 92 of the material box. Tension coil springs 120 are connected between pins 116 and 118 thereby normally biasing the two portions of the box 92 and 94 into the operative position shown in FIG. 4.

A rod holder 124 is secured to the end wall of portion 94 of the material box and has a circular hole 126 formed therethrough for a purpose hereinafter described. A handle 128 is also secured to the end wall of portion 94 of the material box for facilitating manipulation of the material box, this handle being of generally U-shaped configuration.

The support means for the material box includes a pair of arms 130 which are pivotally interconnected with the frame by pivot pins 132. Sleeve bearings 134 are supported at the outer ends of arms 130 and receive the outer ends of the shafts 108 previously described to thereby support the material box in operative position. Arms 130 join with arms 136 extending substantially normally therefrom, the lower ends of arms 136 having slots 140 formed therethrough. Wing nuts 142 are adapted to be inserted through slots 140 and to be threaded into suitable holes provided in the members 14 of the framework for holding the material box support means and the material box in the proper operative position. To facilitate holding the material box down in proper relationship with respect to the screen means and the associated screen rack, small cleets 146 as seen most clearly in FIG. 3 extend inwardly from the lower ends of arms 136 and are adapted to underlie side members 14 of the framework to prevent the material box support means from moving upwardly during operation of the apparatus.

An operating means for the pressure plate hereinafter described includes an elongated member 150 having a handle 152 formed at the outer end thereof. The opposite end of elongated member 150 is pivotally supported by a pivot pin 156 extending between a pair of members 158 secured to the framework member 20 previously described.

A pin member 160 is connected with an intermediate portion of elongated member 150 and serves to detachably pivotally support a member 162 which is bifurcated at the upper end thereof, the lower end of member 162 being connected to a flat pressure plate 164 having a configuration so as to fit relatively snugly with the material box. A plurality of spaced guide members 168 extend upwardly from the upper surface of the pressure plate 164. These guide members 168 are adapted to guide movement of the pressure plate downwardly within the material box and to prevent wedging of the pressure plate within the material box. The pivotal support of the plate along with the provision of the spaced guide members 168 ensures that the pressure plate means will feed down evenly into the material box as the depth of the soil within the material box diminishes.

Three bars 170 are secured to the undersurface of the pressure plate 164 and extend laterally across the width thereof. These bars prevent the soil within the box from rolling on the screen means and from slipping with respect to the pressure plate. When the operating arm 150 comes into contact with the upper surface of the material box 90, this serves as a stop means to prevent the pressure plate and the bars secured to the undersurface thereof from coming into contact with the screen means supported therebelow.

As seen in FIG. 1, a holding means for holding the operating member 150 in a downward position includes an elongated rod 174 which is pivotally interconnected with member 150 by pin 176. The lower end of rod 174 extends through a tubular portion 180 fixed to a plate member 182 pivotally supported at 184 by the framework. A bracket member 186 supports a spring member 188 which normally tends to pivot plate 182 in an upward direction as seen in FIG. 1.

The arrangement is such that the spring 188 tends to rotate the tubular member 180 with respect to rod 174 so as to bind these members and to lock them together. Downward movement of the rod 174 is freely permitted by the components since downward movement of plate 182 serves to align tubular member 180 with rod 174 to permit such downward movement. On the other hand, upward movement of the rod 174 with respect to tubular portion 180 will be prevented due to the canting action and locking interengagement produced by the spring 188.

This holding means sreves to hold the operating member 150 in a downward position and to prevent the pressure plate means associated therewith from moving upwardly during the operation of the apparatus.

A crank means indicated generally by reference numeral 200 includes a handle portion 202 which joins with an elongated crank member 204. This member 204 is rigidly secured to a cross-shaft 206 which is rotatably journaled within the upper portions of members 24 of the framework. A pair of members 210 are rigidly secured to shaft 206, each of members 210 having a pin 212 extending therefrom as shown in FIG. 3.

A bracket member 216 is secured to the elongated operating member 150 and has a pair of pins 218 extending from opposite sides thereof. A pair of tension springs 220 are operatively connected between the pins 212 and 218. A detent means 224 is supported by the framework for engaging member 204 of the crank means to hold the crank means in an upward position after it has been swung clockwise from the position shown in FIG. 1. When the crank means is disposed in an upper position and held in place by the detent means 224, tension will be applied to the spring means 220 to urge the operating member 150 in a downward direction to apply pressure through the intermediary of the pressure plate to soil contained within the material box 90.

During operation of the apparatus, the components may be assumed to be initially in the position shown in FIG. 1. The proper size screen is initially positioned within the screen rack, and when it is desired to load soil within the material box, the rod 174 is inserted within the rod holder 124 to hold member 150 and the associated pressure plate a substantial distance above the material box to enable soil to be loaded thereinto.

After the soil has been inserted within the material box and the material box is disposed in the operative position shown in FIG. 1 relative to the screen rack, handle 152 may be grasped so as to lower the associated pressure plate means into place within the material box with rod 174 extending through tubular portion 180.

The crank means 200 may then be swung in a clockwise direction so as to apply tension to the springs 220 tending to urge operating member 150 and the associated pressure plate in a downward direction within the material box.

Motor 24 may then be energized so as to cause reciprocation of the screen rack with respect to the material box. As the screen rack reciprocates as seen in FIG. 3, it will form flakes of soil in cooperation with the lower part of the soil disposed within the material box, these flakes of soil dropping through the screen means into a suitable pan or the like supported by the apparatus. The pressure plate will continuously apply pressure to the upper part of the soil within the material box so that the soil will be urged into contact with the screen means.

The holding means including members 174–188 including the rod 174 will prevent operating member 150 and the associated pressure plate means from moving upwardly during operation of the apparatus. The constant pressure applied to the soil keeps the material from rolling and will allow any gravel to work to the outside of the material box and be deposited on each end of the screen.

As the screen rack reciprocates with respect to the material box, the cooperation between the tongues 110 and 112 will prevent the lower part of the material box from spreading when pressure is applied thereto. As the screen rack moves in one direction it will tend to cause the material to pile up against one end of the material box and thereby cause the portions of the material box to pivot with respect to one another. The springs 120 will ensure that the material box returns to its initial position as shown in FIG. 4 as the screen rack reciprocates in an opposite direction.

What is claimed is:

1. A soil conditioner comprising a supporting framework, drive means supported by said framework, a screen rack movably supported by said framework and drivingly interconnected with said drive means, screen means carried by the screen rack, a hollow material box having sides, said box being open at the top and bottom thereof, support means for supporting said material box in overlying relationship to said screen means, means for moving at least one of the sides of the box relative to at least one other side thereof, and means to apply pressure to material disposed within the material box.

2. Apparatus as defined in claim 1 wherein said screen rack is mounted for reciprocation on said framework, and with the addition of anti-friction means between the screen rack and the framework for facilitating movement of said screen rack with respect to said framework, said drive means producing reciprocating action of said screen rack.

3. Apparatus as defined in claim 1 wherein said screen means is removably supported by said screen rack, and with the addition of clamping means for holding said screen means in place on said screen rack.

4. Apparatus as defined in claim 1 wherein said support means for the material box is pivotally interconnected with the material box and is also pivotally interconnected with said framework.

5. Apparatus as defined in claim 4 including means operatively associated with said material box support means to move the material box toward and away from said screen means.

6. Apparatus as defined in claim 1 wherein the means to apply pressure to material disposed within the material box comprises a plate having guide means formed thereon and engageable with said material box to guide movement of said pressure plate means within said material box.

7. Apparatus as defined in claim 1 wherein the undersurface of said pressure plate means has spaced bars secured thereto and projecting therefrom for engaging material in the material box.

8. Apparatus as defined in claim 1 including operating means for said pressure plate means, said operating means including an elongated member pivotally interconnected with said framework.

9. Apparatus as defined in claim 8 including resilient means for applying continuous pressure to said elongated member to urge said pressure plate means downwardly within the associated material box.

10. Apparatus as defined in claim 9 wherein said means for applying resilient pressure includes a crank handle and spring means interconnected with said crank handle.

11. Apparatus as defined in claim 8 including holding means for holding said elongated member in a downward position.

12. Apparatus as defined in claim 11 wherein said holding means includes lock means for locking said elongated member in a downward position.

13. A soil conditioner comprising, a supporting framework; drive means supported by said framework; a screen rack movably supported by said framework and drivingly interconnected with said drive means; screen means carried by the screen rack; a hollow material box open at the top and bottom thereof, said material box being formed of two complementary portions pivotally interconnected with one another; support means for supporting said material box in overlying relationship to said screen means, and means to apply pressure to material disposed within the material box.

14. Apparatus as defined in claim 13 wherein said two portions of the material box have cooperating limit stop means formed thereon for limiting relative pivotal movement therebetween.

15. Apparatus as defined in claim 13 including resilient means connected between said two pivotally interconnected portions of the material box for biasing said two portions in one direction of relative movement.

16. Apparatus as defined in claim 13 wherein each of said two portions of the material box are provided with anti-friction means for engaging said rack and movably supporting said material box with respect to said rack.

17. A soil conditioner comprising, a support frame; a hollow material box open at opposite ends thereof supported by said frame, said material box being formed of complementary portions pivotally interconnected; foraminous means on the frame positionable adjacent one of the open ends of the material box; and means to cause relative movement between the foraminous means and the material box.

References Cited

UNITED STATES PATENTS

| | | | |
|---|---|---|---|
| 4,676 | 7/1846 | Miller | 209—262 |
| 656,297 | 8/1900 | Morris | 241—94 |
| 2,161,500 | 6/1939 | Bird | 209—495 XR |
| 2,176,552 | 10/1939 | Vocaturo | 241—84 |
| 2,415,675 | 2/1947 | Crossley | 241—94 XR |
| 2,800,227 | 7/1957 | Kiger | 209—262 |

FRANK W. LUTTER, Primary Examiner

U.S. Cl. X.R.

100—233, 247, 266; 146—178; 209—252, 262; 241—94